United States Patent [19]

Hopper

[11] Patent Number: 4,896,449
[45] Date of Patent: Jan. 30, 1990

[54] AUTOMATIC FISHHOOK BAITING SYSTEM

[76] Inventor: James H. Hopper, One Commerce Park Ave., Box 245, South Chatham, Mass. 02659

[21] Appl. No.: 385,011

[22] Filed: Jul. 25, 1989

[51] Int. Cl.⁴ ..................... A01K 79/00; A01K 83/00
[52] U.S. Cl. ............................................. 43/4; 43/27.4
[58] Field of Search ........................ 43/4, 27.4, 44.83

[56] References Cited

U.S. PATENT DOCUMENTS

| 1,221,904 | 4/1917 | Potier . | |
|---|---|---|---|
| 2,511,828 | 6/1950 | Andrist | 43/4 |
| 2,518,590 | 8/1950 | Andrist | 43/4 |
| 3,626,630 | 12/1971 | Tison | 43/6.5 |
| 4,015,359 | 4/1977 | Andrews | 43/4 |
| 4,250,648 | 2/1981 | Jacobsen | 43/4 |
| 4,266,359 | 5/1981 | Alex | 43/6.5 |
| 4,437,254 | 3/1984 | Fancey et al. | 42/27.4 |
| 4,477,992 | 10/1984 | Lang et al. | 43/4 |
| 4,567,684 | 2/1986 | Bjorshol | 43/4 |
| 4,630,388 | 12/1986 | Furlong | 43/27.4 |
| 4,638,583 | 1/1987 | Bjorshol | 43/4 |
| 4,641,452 | 2/1987 | Bjorshol | 43/4 |
| 4,648,193 | 3/1987 | Alex et al. | 43/4 |
| 4,704,815 | 11/1987 | Poirier et al. | 43/4 |
| 4,751,787 | 6/1988 | Jonsson | 43/4 |

FOREIGN PATENT DOCUMENTS 76025 12/1949 Norway .
92762 9/1958 Norway .

OTHER PUBLICATIONS

An Atlantic Fisherman's Guide to Longlining Systems, Technical Longline Working Group, Department of Fisheries and Oceans, 1984.

Primary Examiner—M. Jordan
Attorney, Agent, or Firm—Nutter, McClennen & Fish

[57] ABSTRACT

An improved system for baiting fishhooks attached to a fishing line is disclosed. The system comprises a line storage unit and a baiting unit. A fishing line is drawn out of the storage unit and through a bait hopper which contains a series of bearings and deflectors. The hopper is filled with a mixture of liquid and baits, and as the fishing line with attached hooks is drawn through the mixture, each fishhook snags a bait before exiting the hopper. The hopper may include a rotating bearing for varying the path of the fishing line and hooks through the liquid/bait mixture, thus increasing the likelihood that each hook will be baited. The motion of the fishing line as it is drawn through the mixture creates a circulation, which tends to prevent accumulation of the baits at the bottom of the hopper that could interfere with the baiting process.

22 Claims, 4 Drawing Sheets

AUTOMATIC FISHHOOK BAITING SYSTEM

BACKGROUND OF THE INVENTION

1. Field of the Invention

This invention relates generally to the field of commercial fishing equipment and, more particularly, to the field of automatic fishhook baiting systems used for commercial fishing.

2. Discussion of the Prior Art

One popular commercial fishing technique involves setting long fishing lines to which hundreds or thousands of baited hooks are attached by individual gangions or snoods. In order to maximize profits from this type of fishing, it is generally desirable to set as many baited hooks as quickly as possible, while using the minimum number of crew to do so. Obviously, it is impossible to bait by hand more than one hook every few seconds and such a manual process would pose unacceptable risk of injury. Accordingly, there exists a need for a system which can automatically bait large number of hooks rapidly with high reliability and consistent results.

One type prior art baiting system employs a fishhook "guide" which is used to control the movement or orientation of the hook. A typical guide consists of a tube having a slot running along its length. As a fishing line is drawn through the tube, the barb portion of the hook rides in the slot and is directed towards a baiting mechanism. The disadvantages of such guide systems are numerous. First, each hook must be precisely guided into position to receive a bait. Thus, if a hook is somewhat deformed or catches momentarily, the hook may not be properly oriented at the correct time and will pass through without receiving a bait.

Conventional guide systems tend to be large in size and costly to manufacture, which often renders them unusable or uneconomical for smaller fishing vessels. Moreover, such guide systems are often mounted permanently to one fishing vessel, which tends to prevent quick removal for repair or use on another vessel. Most guide systems include a number of moving parts which may require adjustment and which increase the likelihood of malfunction or failure of the baiting system.

Due to the unique requirements of each type or make of guide mechanism, many such mechanisms may be used only with particular (matched) fishing line storage or handling devices in an integrated system. As a result, it is often impossible to use a guide type baiting machine of one make in combination with a line storage device of a different make.

SUMMARY OF THE INVENTION

The present invention provides an improved system for automatically baiting individual fishhooks which are attached to a fishing line. The system includes a line storage unit and a baiting unit. The line storage unit comprises a bin for storing a fishing line having fishhooks attached by gangions at spaced intervals. The fishhooks are arranged in a hook cartridge which is attached to the bin. The cartridge keeps the hooks separate and untangled, while allowing them to dispense sequentially as the fishing line is drawn from the bin.

The baiting unit comprises a bait hopper having an inlet and an outlet for a fishing line. The bait hopper includes a bearing disposed near the inlet, a second bearing disposed near the outlet, and a third bearing which is disposed between the first and second bearings.

The bait hopper is filled with a mixture of liquid and baits. As the fishing line is drawn from the storage bin, it enters the inlet of the hopper and follows a path from one bearing to the next. As the fishhooks pass through the liquid/bait mixture within the hopper, each hook snags at least one bait. Thus, as the fishing line and attendant hooks pay out of the hopper's outlet, substantially all of the hooks are baited and ready to be set.

The present invention provides numerous advantages over prior art baiting systems. First, the present invention may be manufactured at substantially lower cost due to the simplicity of its components and limited number of moving parts. The present invention is effective at baiting 95% or more of all fishhooks which pass through the baiting unit, is easily operated by one person, and can be used to bait up to 3,000 hooks per hour. As a result, the present invention may be economically used with relatively small commercial fishing vessels, as well as larger vessels.

The present invention incorporates improved safety features including, for example, a bait hopper having transparent sidewalls, which allow an attendant to safely and continuously view the level of liquid/bait mixture in the hopper. The present invention contains no complicated hook guiding devices and the baiting unit can be used or adapted for use with other types of line storage units. In addition, the present invention is relatively lightweight, portable and can be quickly and easily installed or removed from most commercial fishing vessels.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
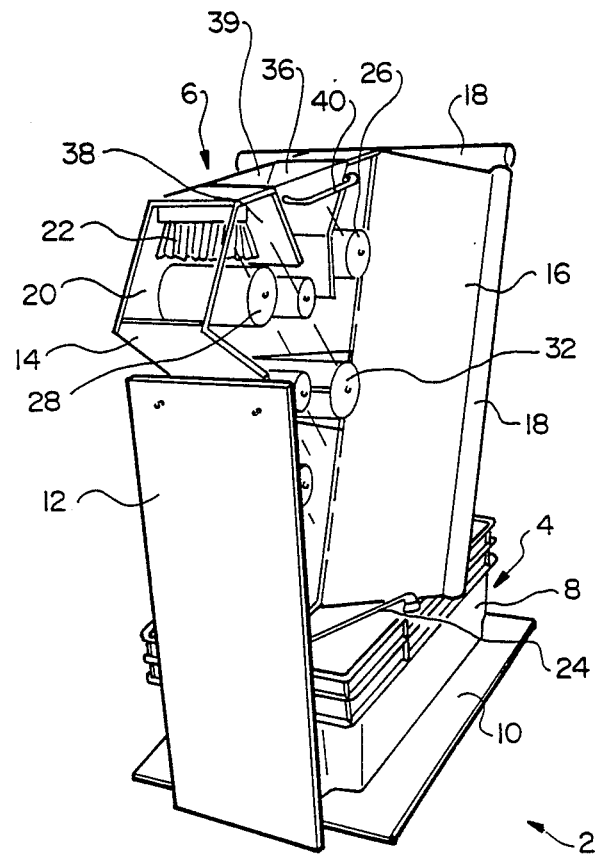
FIG. 1 is a perspective view of a fishhook baiting system constructed in accordance with the preferred embodiment of the present invention.

FIG. 1 is a perspective view of a fishhook baiting system 2 which is intended for use on a fishing vessel (not shown) and which includes a fishing line storage unit 4 and a baiting unit 6. A line storage bin 8 rests upon a base 10 of the baiting unit 6. A vertical support 12 holds a bait hopper 14 above the bin 8. The rear of the bait hopper 14 is fitted with a cowl 16 which extends rearwardly over the bin 8. The edges of the cowl 16 are fitted with tubular guards 18, which may be formed as integral parts of the cowl 16 or as separate members that are attached to the cowl 16. A brush 22 is disposed in proximity to an outlet 20 of the bait hopper 14. Two braces 24, only one of which is visible in FIG. 1, extend from the base of the bait hopper 14 to the base of the cowl 16.

Figure 2:
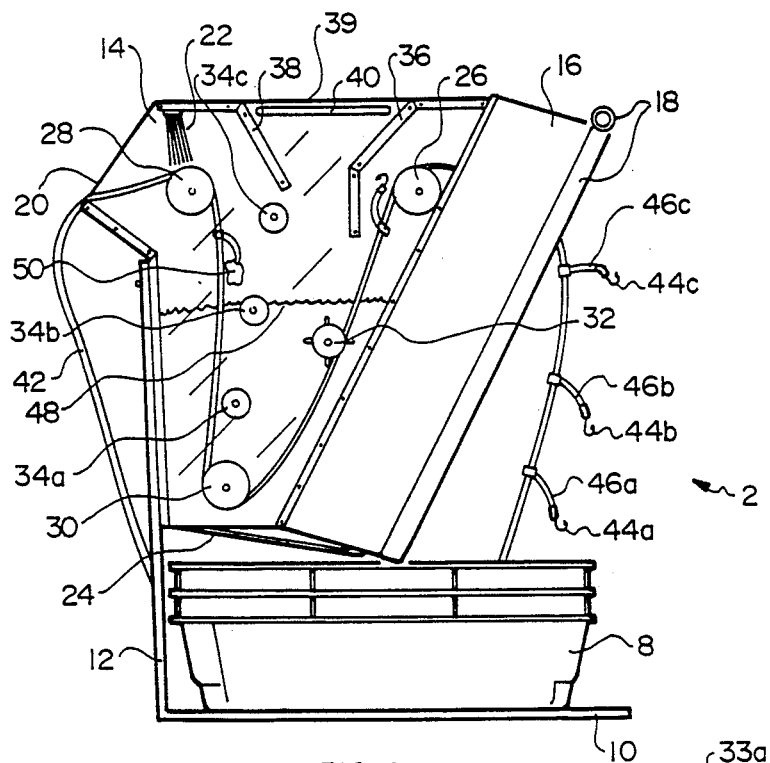
FIG. 2 is a side view of the baiting system shown in FIG. 1.
Figure 2A:
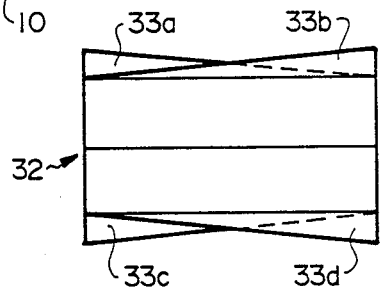
Figure 3:
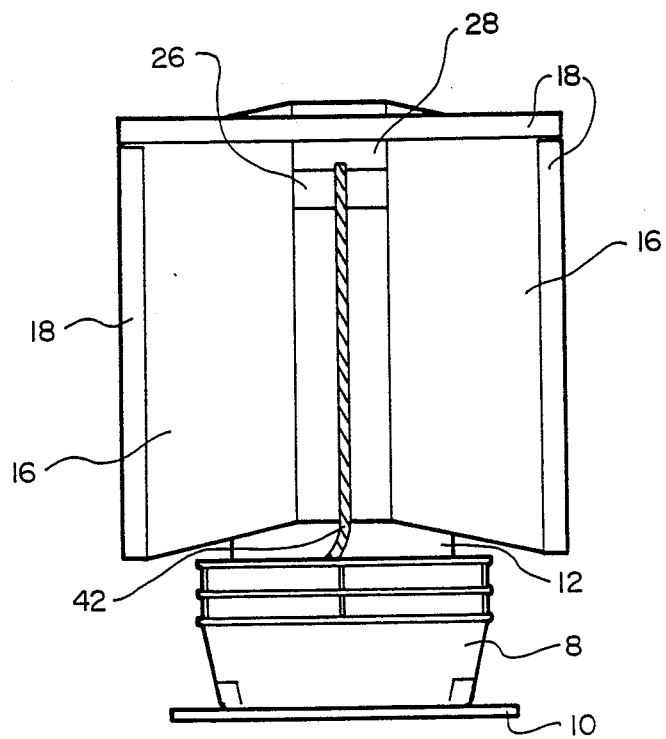
FIG. 3 is a rear view of the baiting system shown in FIG. 1.

As may be seen more clearly with reference to FIG. 2, which is a side view of the system of FIG. 1, and FIG. 3 (which is a rear view) the interior of the bait hopper 14 contains several bearings and deflectors. An inlet bearing 26 is disposed in proximity to an inlet 28 of the hopper 14. An outlet bearing 28 is disposed in proximity to the outlet 20 of the hopper 14, at approximately the same elevation as the inlet bearing 26. An intermediate bearing 30 is disposed in the lower portion of the hopper 14. A rotating bearing 32 is disposed between the inlet bearing 26 and the intermediate bearing 30.

Three guards 34a, 34b, and 34c are disposed at different heights in the central portion of the hopper 14. An elbow-shaped deflector 36, which is connected to the top of the interior of the hopper 14, is disposed adjacent to the inlet bearing 26. Another deflector 38 is similarly connected adjacent to the outlet bearing 28. Each side of the top of the hopper 14 is fitted with a handle 40, and a bait inlet 39 is disposed in the top of the hopper 14. The bottom of the hopper 14 may include a flap or trap door by which the hopper 14 may be emptied.

The sidewalls of the bait hopper 14 may comprise, for example, a transparent material such as plexiglass or an "unbreakable" transparent material sold under the trademark LEXAN. The cowl 16, bearings 26, 28, 30, 32, deflectors 36, 38, braces 24 and handles 40 may comprise, for example, stainless steel. The bin 8 and guards 18 may comprise, for example, plastic. Other suitable materials may be substituted to meet the requirements of a particular application.

When in use, the system 2 is generally located at the stern of a fishing vessel with the outlet 20 facing outward from the stern. The system 2 stands approximately 5 feet high (measured from the base 10 to the top of the hopper 14), is approximately 3 feet wide and 4 feet long. The baiting unit 6, when the hopper 14 is empty, weighs approximately 65 pounds and can be moved by one or two persons using the handles 40. The line storage unit 4, when fully loaded with a fishing line of 1,200–1,500 feet, weighs about 30–40 pounds. The entire baiting system 2 may be removed and stored in a secure place, either on the vessel or on shore, and quickly reinstalled when ready for use.

The operation of the baiting system 2 will now be described in detail. An attendant (not shown) manually takes one end of a fishing line 42, which is normally stored in the bin 8, and threads the line through the interior of the hopper 14, as shown in FIG. 2. Attached to the fishing line 42 at spaced intervals are individual fishhooks 44, each of which is secured by a gangion 46. The fishing line 42, fishhooks 44 and gangions 46 represent widely available commercial fishing tackle which may be purchased from any of a number of vendors. Once threaded through the hopper 14, the end of the fishing line 42 is secured to a buoy or weight (not shown) which is later released into the water at the appropriate time.

The hopper 14 is partially filled with a mixture of liquid and baits, which may be poured in through the bait inlet 39. The amount of bait loaded into the hopper 14 is somewhat arbitrary, but there must be sufficient bait in the hopper 14 to ensure that each fishhook snags at least one bait as line 42 is drawn through the hopper. It is not necessary that the baits take any particular size or shape. However, it is preferred that some liquid, usually water, be added to the hopper 14 along with the baits. The liquid tends to suspend the baits within the hopper 14 and thus prevent accumulation of baits at the bottom of the hopper, which could cause choking. A line 48 indicates a nominal level for the liquid/bait mixture.

If the sidewalls of the hopper 14 are constructed from a substantially transparent material, the attendant may continuously monitor the level of the liquid/bait mixture without having to stop the baiting process or look into the baiting inlet 39. This feature of the present invention provides enhanced operating safety since the fishing line 42 may pass through the hopper 14 at speeds of 7–8 miles per hour, thus posing a significant potential hazard to the attendant. In addition, each handle 40 provides a safe handhold for the attendant who may be standing next to the baiting system 2 on a rolling vessel.

The end of the fishing line which is attached to a weight or buoy is released into the water and, as the fishing vessel moves through the water, the fishing line 42 (with attached hooks 44 and gangions 46) is drawn out of the bin 8 and into the inlet 28 of the hopper 14. It should be noted that if any of the hooks become tangled as they exit the bin 8, they tend to bounce off of the cowl 16 and become separated before entering the inlet 28. The deflector 36 prevents any hooks from swinging too far into the interior of the hopper 14 and possibly becoming entangled with other hooks or the fishing line 42. A similar function is performed by guards 34a, 34b, 34c and deflector 38.

The fishing line 42 travels downwardly over the inlet bearing 26 and rotating bearing 32. The function of the rotating bearing is described in detail below. The line 42 and attached hooks then enter the liquid/bait mixture where, in general, each hook snags at least one bait. The line 42 travels around intermediate bearing 30 and upwards to outlet bearing 28, carrying along the baited hooks as indicated at 50. As the baited hooks pass over the outlet bearing 28, they contact the brush 22 which tends to dislodge any loosely attached baits, which generally fall back into the hopper 14. The line 42 then travels through the outlet 20 and pays out into the water.

The passage of the line 42 through the hopper 14 tends to create a circulation of the liquid/bait mixture. This circulation advantageously reduces the accumulation of baits at the bottom of the hopper, which if left unchecked might lead to fouling or interference with the baiting process.

Shown in enlarged form in FIG. 2 is the rotating bearing 32 which is disposed between the inlet bearing 26 and intermediate bearing 30. The rotating bearing 32 is secured to the sides of the hopper 14 in a manner which permits free rotation. The rotating bearing 32 is generally cylindrical in cross-section with a series of radially extending fins 33. The radius of each fin 33 is largest at one end of the bearing 32 and decreases gradually to a minimum at the opposite end of the bearing 32.

Due to the varying radii of the fins 33 and the rotation of the bearing 32, the point at which the fishing line 42 contacts the bearing 32 continuously varies. In other words, the bearing 32 operates to continuously alter the path of the fishing line 42 as it travels from the bearing 32 to the bearing 30 and beyond. Thus, the effect of the bearing 32 is to increase the likelihood that each hook will snag at least one bait by forcing each hook to pass through the liquid/bait mixture along a slightly different path than the hooks which immediately preceded it. Bearings of other shapes or other types of components may be substituted for bearing 32 with the attainment of a similar result.

Figures 4, 4A:
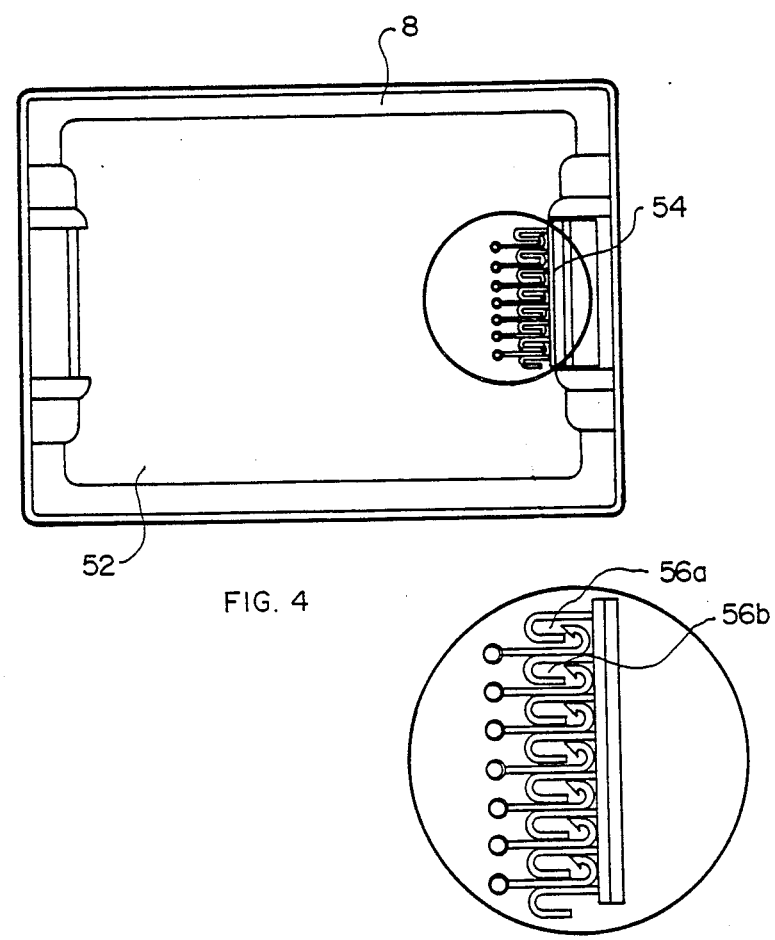
FIG. 4 is an enlarged top view of the line storage bin shown in FIG. 1.

FIG. 4 is an enlarged top view of the storage bin 8. The bin 8 includes a space 52 in which the fishing line 42 is normally stored. Mounted vertically at one end of the interior of the bin 8 is a hook cartridge 54. The hook cartridge 54 comprises a series of channels 56 which are adapted to receive the barb and lower shank portion of a fishhook. The cartridge 54 retains the fishhooks in a sequenced arrangement such that as the fishing line 42 is drawn out of the bin 8, the fishhooks are automatically dispensed in sequence from the top of the cartridge 54. Thus, the cartridge 54 tends to keep the hooks separate and untangled until such time as they are drawn out of the bin 8 and into the hopper 14 for baiting. It should be understood that before the fishing line in one bin is completely dispensed, a line from another bin may be connected and, at the appropriate time, the second bin may be placed under the baiting unit 6 so as to maintain uninterrupted baiting operation of the system 2.

It should be noted that other types of fishing line storage or dispensing devices may be substituted for the bin 8 for use in conjunction with the baiting unit of the present invention. In general, so long as any fishing line having hooks attached by gangions is drawn through the hopper 14 as described above, the baiting unit 6 can be used to automatically bait such hooks.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is

1. A system for baiting fishhooks which are attached to a fishing line, said system comprising:
    A. means for storing a fishing line having a plurality of fishhooks attached thereto at spaced intervals; and
    B. means for baiting fishhooks including a bait hopper having an inlet and an outlet, said hopper for holding a mixture of a liquid and a plurality of baits,
        1. said hopper including an inlet bearing disposed in proximity to said inlet, an outlet bearing disposed in proximity to said outlet, and at least one intermediate bearing disposed between said inlet bearing and said outlet bearing,
        2. said hopper further including means for varying substantially continuously a path which said fishing line follows through said mixture,
            whereby as said fishing line is drawn from said means for storing and through said hopper, at least one of said baits is attached to substantially each one of said fishhooks.

2. The system as in claim 1 wherein said means for varying comprises a rotating bearing disposed between said intermediate bearing and said inlet bearing, said rotating bearing having a cross-section of varying radius, whereby as said fishing line is drawn through said hopper and passes over said rotating bearing, a point at which said fishing line contacts said rotating bearing varies substantially continuously, thereby varying said path.

3. The system as in claim 2 wherein said rotating bearing comprises a generally cylindrical shape having a plurality of tapered fins extending radially outward.

4. The system as in claim 1 wherein said bait hopper comprises at least one substantially transparent sidewall, whereby said mixture of liquid and baits may be observed.

5. The system as in claim 1 wherein the inlet of said bait hopper is coupled to a cowl, said cowl for preventing said fishhooks from entangling one another as said fishing line is drawn from said means for storing into said inlet.

6. The system as in claim 1 further including means for circulating said mixture of liquid and baits, thereby substantially preventing said bait from accumulating and interfering with the baiting of said fishhooks.

7. The system as in claim 6 wherein said means for circulating includes said fishing line.

8. The system as in claim 1 wherein said means for storing comprises a bin having a fishhook cartridge attached thereto, said hook cartridge including a plurality of channels for arranging said fishhooks, whereby as said fishing line is drawn from said bin, said fishhooks are dispensed sequentially from said fishhook cartridge.

9. An apparatus for baiting fishhooks which are attached to a fishing line, said apparatus comprising:
    A. a bait hopper having an inlet and an outlet, said hopper for holding a mixture of a liquid and a plurality of baits,
        1. said hopper including an inlet bearing disposed in proximity to said inlet, an outlet bearing disposed in proximity to said outlet, and at least one intermediate bearing disposed between said inlet bearing and said outlet bearing,
        2. said hopper further including means for varying substantially continuously a path which said fishing line follows through said mixture,
            whereby as said fishing line is drawn through said hopper, at least one of said baits is attached to substantially each one of said fishhooks.

10. The system as in claim 9 wherein said means for varying comprises a rotating bearing disposed between said intermediate bearing and said inlet bearing, said rotating bearing having a cross-section of varying radius, whereby as said fishing line is drawn through said hopper and passes over said rotating bearing, a point at which said fishing line contacts said rotating bearing varies substantially continuously, thereby varying said path.

11. The system as in claim 10 wherein said rotating bearing comprises a generally cylindrical shape having a plurality of tapered fins extending radially outward.

12. The system as in claim 9 wherein said bait hopper comprises at least one substantially transparent sidewall, whereby said mixture of liquid and baits may be observed.

13. The system as in claim 9 wherein the inlet of said bait hopper is coupled to a cowl, said cowl for preventing said fishhooks from entangling one another as said fishing line is drawn from said means for storing into said inlet.

14. The system as in claim 9 further including means for circulating said mixture of liquid and baits, thereby substantially preventing said bait from accumulating and interfering with the baiting of said fishhooks.

15. The system as in claim 14 wherein said means for circulating includes said fishing line.

16. A method for baiting fishhooks which are attached to a fishing line, said method comprising the steps of:
    drawing said fishing line through an inlet of a bait hopper, said hopper containing a mixture of a liquid and a plurality of baits;

drawing said fishing line over an inlet bearing disposed in proximity to said inlet and into said mixture;

varying substantially continuously a path which said fishing line follows through said mixture;

drawing said fishing line over an intermediate bearing disposed in said hopper; and drawing said fishing line over an outlet bearing disposed in proximity to an outlet of said hopper and through said outlet, whereby at least one of said baits is attached to substantially each one of said fishhooks.

17. The method as in claim 16 wherein said means for varying comprises a rotating bearing, said rotating bearing having a cross-section of varying radius, whereby as said fishing line is drawn over said rotating bearing, the point at which said fishing line contacts said rotating bearing varies substantially continuously, thereby varying said path.

18. The method as in claim 17 wherein said rotating bearing comprises a generally cylindrical shape having a plurality of tapered fins extending radially outward.

19. The method as in claim 16 wherein said bait hopper comprises at least one substantially transparent sidewall, whereby said mixture of liquid and baits may be observed.

20. The method as in claim 16 wherein the inlet of said bait hopper is coupled to a cowl, said cowl for preventing said fishhooks from entangling one another as said fishing line is drawn into said inlet.

21. The method as in claim 16 wherein as said fishing line is drawn through said mixture of liquid and baits, said mixture is circulated within said hopper, thereby substantially preventing said bait from accumulating and interfering with the baiting of said fishhooks.

22. The method as in claim 16 wherein said fishhooks are initially stored in a fishhook cartridge such that as said fishing line is drawn into said bait hopper, said fishhooks are dispensed sequentially from said fishhook cartridge.

* * * * *